(12) United States Patent
Dizengof

(10) Patent No.: US 10,299,311 B2
(45) Date of Patent: May 21, 2019

(54) SYSTEM AND METHOD FOR ENSURING CONTINUOUS COMMUNICATION BETWEEN A USER DEVICE AND AN EMERGENCY DISPATCHER UNIT

(71) Applicant: Carbyne Ltd., Tel-Aviv (IL)

(72) Inventor: Alex Dizengof, Tel Aviv (IL)

(73) Assignee: Carbyne Ltd., Tel-Aviv (IL)

( * ) Notice: Subject to any disclaimer, the term of this patent is extended or adjusted under 35 U.S.C. 154(b) by 0 days.

(21) Appl. No.: 15/709,004

(22) Filed: Sep. 19, 2017

(65) Prior Publication Data

US 2018/0084599 A1 Mar. 22, 2018

Related U.S. Application Data

(60) Provisional application No. 62/397,513, filed on Sep. 21, 2016.

(51) Int. Cl.
| | |
|---|---|
| *H04W 4/90* | (2018.01) |
| *G06F 11/00* | (2006.01) |
| *H04L 12/26* | (2006.01) |
| *H04L 29/14* | (2006.01) |
| *H04L 29/08* | (2006.01) |
| *H04W 76/15* | (2018.01) |
| *H04W 76/19* | (2018.01) |
| *H04W 88/06* | (2009.01) |

(52) U.S. Cl.
CPC .............. *H04W 76/19* (2018.02); *G06F 11/00* (2013.01); *H04L 43/0811* (2013.01); *H04L 67/148* (2013.01); *H04L 69/40* (2013.01); *H04W 4/90* (2018.02); *H04W 76/15* (2018.02); *H04W 88/06* (2013.01)

(58) Field of Classification Search
CPC ....................................................... H04M 7/00
See application file for complete search history.

(56) References Cited

U.S. PATENT DOCUMENTS

| | | | |
|---|---|---|---|
| 8,483,654 B2 | 7/2013 | Levinson et al. | |
| 8,516,308 B1 * | 8/2013 | Gill | H04L 67/34 714/38.1 |
| 9,037,108 B1 | 5/2015 | Delatorre | |
| 9,426,638 B1 | 8/2016 | Johnson | |
| 10,127,125 B2 * | 11/2018 | Krishnan | G06F 11/0706 |
| 2004/0102178 A1 | 5/2004 | Williams | |
| 2006/0020858 A1 * | 1/2006 | Schaefer | G06F 11/0715 714/38.1 |

(Continued)

*Primary Examiner* — Joshua L Schwartz

(57) ABSTRACT

A system and method for ensuring continuous communication between a user device and an emergency dispatcher unit. The method includes establishing a first communication link between a user device and an emergency dispatcher unit via a first application installed on the user device; receiving reconnection information based on the first communication link; monitoring the first communication link for detection of an imminent crash of the first application based on analysis of connection parameters; and establishing, using the reconnection information, a second communication link between the user device and the emergency dispatcher through a second application when an imminent crash is detected, where the second communication link is established before the first application has crashed, such that there is continuous transmission of communication between the user device and the emergency dispatcher unit.

17 Claims, 2 Drawing Sheets

(56) References Cited

U.S. PATENT DOCUMENTS

| | | |
|---|---|---|
| 2007/0142028 A1 | 6/2007 | Ayoub et al. |
| 2011/0086607 A1* | 4/2011 | Wang ............... H04M 3/5116 455/404.1 |
| 2013/0103977 A1* | 4/2013 | Zimmermann ..... G06F 11/0751 714/4.11 |
| 2015/0195812 A1 | 7/2015 | Park et al. |
| 2015/0215755 A1 | 7/2015 | Bekanich |
| 2015/0317809 A1 | 11/2015 | Chellappan et al. |
| 2015/0347220 A1 | 12/2015 | Hermany et al. |
| 2016/0050550 A1 | 2/2016 | Anand et al. |
| 2016/0088455 A1 | 3/2016 | Bozik et al. |
| 2016/0093197 A1 | 3/2016 | See et al. |
| 2016/0212605 A1 | 7/2016 | Clawson |

* cited by examiner

SYSTEM AND METHOD FOR ENSURING CONTINUOUS COMMUNICATION BETWEEN A USER DEVICE AND AN EMERGENCY DISPATCHER UNIT

CROSS-REFERENCE TO RELATED APPLICATIONS

This application claims the benefit of U.S. Provisional Application No. 62/397,513 filed on Sep. 21, 2016, the contents of which are hereby incorporated by reference.

TECHNICAL FIELD

The present disclosure relates generally to a system and method for managing communication between a user device and an emergency dispatcher unit, and more specifically to a system and method for ensuring continuous communication between a user device and an emergency dispatcher unit during a transmission.

BACKGROUND

Mobile devices, such as smart phones, tablets, wearable servers and the like, have become ubiquitous and are used daily by many for a variety of purposes such as browsing the internet, sharing files, playing games, purchasing online products and services, and so on. Notwithstanding the increased use of these functions, the main feature of mobile devices remains communicating with other people. Mobile devices offer many options for communication, including voice, text, email and video messaging with family, friends, co-workers and authorities.

Many of these functions are implemented using applications installed on an operating system running on the mobile device. For example, communication applications, such as Viber®, WhatsApp®, native text messaging applications, and the like, allow user device owners to communicate with other device owners via these applications over a network connection, such as the internet. As with any kind of application, they can become vulnerable to occasional failures and errors. While some errors may only have a minor impact on the operation of the device, such as slightly delayed responses, some errors may cause a complete application failure, or a crash.

The outcome of such a failure may be a disconnected or dropped call, failure to transmit data, incomplete sending of messages, and so on. These crashes may simply be a nuisance when dealing with non-essential applications associated with, for example, social networks, news, sports, games, and the like, and a user can simply restart the application after the crash to continue its functionality. However, in cases where the application's task is more urgent, such as when it is used to communicate and transmit voice and multimedia information to an emergency dispatcher, the communication stability and reliability is essential.

While that are currently a variety of solutions available for handling different kinds of issues that users may encounter while using emergency applications for mobile devices, none of them provides a solution that ensures continuous communication between a user device, e.g., a mobile device, and an emergency dispatcher unit, e.g., 9-1-1 dispatcher in face of an application failure.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for ensuring continuous communication between a user device and an emergency dispatcher unit, comprising establishing a first communication link between a user device and an emergency dispatcher unit via a first application installed on the user device; receiving reconnection information based on the first communication link; monitoring the first communication link for detection of an imminent crash of the first application based on analysis of connection parameters; and establishing, using the reconnection information, a second communication link between the user device and the emergency dispatcher through a second application when an imminent crash is detected, wherein the second communication link is established before the first application has crashed, such that there is continuous transmission of communication between the user device and the emergency dispatcher unit.

Certain embodiments disclosed herein also include a system for ensuring continuous communication between a user device and an emergency dispatcher unit, the system comprising: a processing circuitry; and a memory, the memory containing instructions that, when executed by the processing circuitry, configure the system to: establish a first communication link between a user device and an emergency dispatcher unit via a first application installed on the user device; receive reconnection information based on the first communication link; monitor the first communication link for detection of an imminent crash of the first application based on analysis of connection parameters; and establish, using the reconnection information, a second communication link between the user device and the emergency dispatcher through a second application when an imminent crash is detected, wherein the second communication link is established before the first application has crashed, such that there is continuous transmission of communication between the user device and the emergency dispatcher unit.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
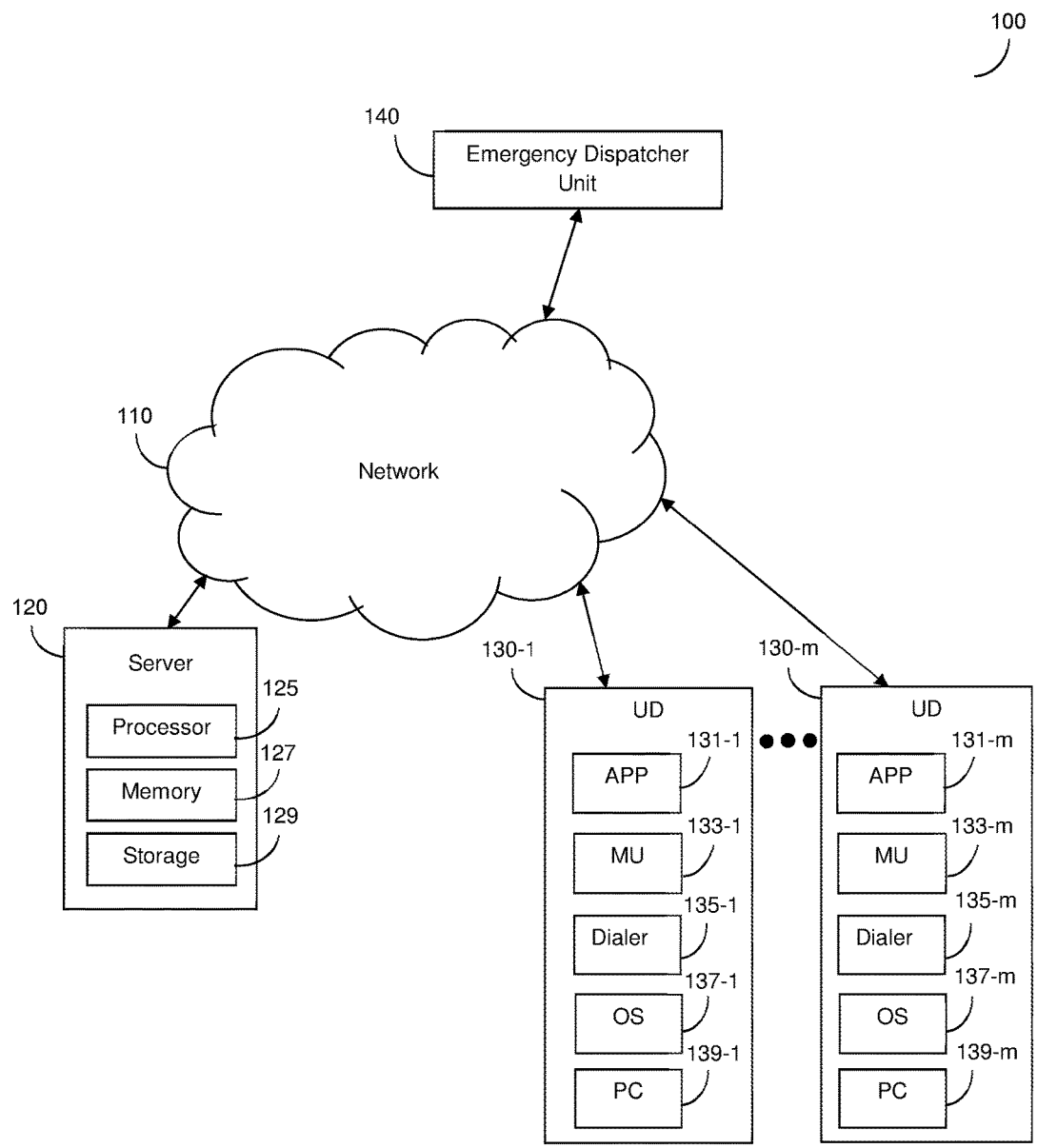
FIG. 1 is a network diagram of a system for ensuring continuous communication between a user device and an emergency dispatcher unit according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for ensuring continuous communication between a user device and an emergency dispatcher unit. An emergency communication application is enabled to establish a first communication link between the user device and the emergency dispatcher unit. The system collects reconnection information in order to readily establish a second communication link if necessary. One or more connection parameters are monitored and analyzed based on the first communication link to detect an imminent crash of the emergency application. When a malfunction of the application is detected, the system establishes the second communication link using the reconnection information, such as causing a dialer of the user device to dial a specific telephone number associated with the emergency dispatcher, before the first communication link is lost. Dialing using the second communication link enables the user device and the emergency dispatcher unit to remain connected over the second communication link prior to the crash of the emergency application.

FIG. 1 shows an exemplary and non-limiting schematic diagram of a system 100 for ensuring continuous communication between a user device and an emergency dispatcher unit according to an embodiment. The system 100 comprises a network 110 which enables communication between the different elements of the system 100 connected to the network 110. The network 110 may be a local area network (LAN), wide area network (WAN), metro area network (MAN), the Internet, the worldwide web (WWW), and the like.

One or more user devices (UDs) 130, are communicatively connected to the network 110, i.e., UD 130-1 through 130-*m*, where 'm' is an integer having a value of '1' or larger. The UD 130 may be, for example, a smart phone, a mobile phone, a laptop, a tablet computer, a wearable server, or any other device capable of sending and receiving application data. A first application, such as an emergency application (app) 131 is installed on the UD 130. The emergency app 131 is software that allows for the establishment of a communication link that enables the UD 130 to send to and receive from an emergency dispatcher unit (EDU) 140 data, text, multimedia, audio, live streaming, and the like, through the network 110.

The EDU 140 may be for example, a police dispatcher, a medical dispatcher, a fire department dispatcher, and similar emergency systems to which a UD 130 is connected to or is attempting to connect to via a first communication link. The first communication link is a channel through which a user associated with the UD 130 and a dispatcher associated with the EDU 140, are able to communicate. The first communication link may be established on the network 110 and may include a wired network, Wi-Fi network, 3G network, 4G network, voice over internet protocol (VOIP) network, and the like.

A memory unit (MU) 133 is further included within the UD 130 and configured to store therein characteristics based on the first communication link, as further described herein below. The UD 130 additionally includes a second application, such as a dialer 135 embedded within the UD 130, which is configured to establish an alternative communication link between the UD 130 and the EDU 140. In an embodiment, the dialer 135 is configured to communicatively connect the UD 130 to the EDU 140 via an alternate transmission path, where the alternate transmission path is different than the default connection method of the first communication link. In an embodiment, the UD 120 is configured to connected to the network via at least two methods, such as via a cellular network, wired network, a WiFi network, a short range wireless communication protocol, a combination thereof, and the like.

An operating system (OS) 137 is installed on the UD 130. The OS 137 is a system software configured to manage computer hardware and software resources and provide common services for applications, such as the emergency app 131. The OS 137 installed on the UD 130 may be, for example, Linux® OS, UNIX® OS, iOS®, Android® and the like. The OS 137 may be configured to send commands, notifications, and alerts to the app 131 based on any identified errors.

The UD 130 further includes a processing circuitry (PC) 139. The PC 139 is a hardware component configured to execute the operation of software, including running the OS 137, the dialer 135 and the app 131. The PC 139 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the PC 139 to perform the various processes described herein.

A server 120 may also be coupled to the system 100. The server 120 includes a hardware component, and a software component configured to execute predetermined computing tasks. The server 120 includes a processing unit, such as a processor 125, a memory 127 and a storage 129. The server 120 may be used to receive data based on, for example, a detected crash of the app 131 associated with the first communication link, and store the data on the storage 129 for future retrieval. According to another embodiment, the server 120 may analyze the received data based on the crash for identification of, for example, the source that caused the crash, the time at which the crash occurred, files accessed on the user device 130 when the crash happened, network status and similar relevant parameters of the UD 130.

The server 120 may be configured to be connected to a plurality of user devices, e.g., UD 130-1 to UD 130-*m*. Data from each UD 130 may be sent and stored within the storage 129 and used to predict future imminent crashed of applications, either on the same user device or on other devices.

Thus, each time a crash occurs, the system collects additional information in order to better predict a potential communication failure.

According to an embodiment, the PC 139 is configured to identify an imminent crash of an emergency app 131 that has been executed on the UD 130. The imminent crash may be caused by, for example, an error in a processor command, error in hardware, missing files, corrupt code, network failure, network overload, and the like, each of which may be associated with the first communication link between the UD 130 and the EDU 140 such that the error causes a break in the first communication link. The identification of the imminent crash may include for example, identifying by the PC 139 an error, sending a notification based on the identified error to the OS 137, and the OS 137 relaying to the emergency app 131 a crash signal that is configured to terminate the emergency app 130.

According to another embodiment, upon detection of an imminent crash of the emergency app 131, the PC 139 may suspend the crash of the emergency app 131 by, for example, executing a certain command, such as a "sleep" command. The "sleep" command may suspend the crash of the emergency app 131 for a predefined period of time, e.g., 15 seconds, until a further step is performed.

After a first communication link is established, reconnection information is recorded. Reconnection information is data related to establishing an additional connection between the UD 130 and the EDU 140, and may include a direct phone number to contact the EDU 140, a VOIP identification of the emergency dispatcher unit, such as a username, and the like. In an embodiment, the PC 139 may be configured to store the reconnection information in the MU 133 when the first communication link is established.

For example, the information may indicate that the first communication link was established between a UD 130 currently located at Queens, N.Y., having a phone number of 1-718-555-0123, and a 9-1-1 dispatcher unit located in Manhattan, N.Y. According to the same example, the characteristics may also include the specific telephone number associated with a particular telephone station associated with the EDU 140, and an alternative method of reaching the operator for that station.

The UD 130 is monitored to detect any potential imminent application crashes that would affect the first communication link. The PC 139 is configured to collect and analyze one or more connection parameters based on the first communication link and may include files accessed on the user device during the first connection link, network status, operating system errors, and emergency application responsiveness. The one or more connection parameters may be stored on and collected from, for example, the MU 133.

If an imminent crash is detected, the PC 139 may be configured to cause a second application, such as the dialer 135 of the UD 130, to dial the specific telephone number associated with the EDU 140 establishing a second communication link prior to the crash of the emergency app 131. According to one embodiment, the second communication link may be established on, for example, a cellular network. Thus, before the first communication link becomes ineffective, the dialer 135 enables the continuous connection of the UD 130 to the same EDU 140 using, for example, a cellular network. Therefore, a voice call, multimedia streaming, texting, and other means of communication between the UD 130 and EDU 140 will continue uninterrupted, shifting from the first communication link to the second communication link without a noticeable loss of connection.

As a non-limiting example, a person wishing to report a fire to an emergency service such as 9-1-1, can use an emergency application installed on the person's mobile phone. The application connects the mobile phone with a 9-1-1 dispatcher unit, using, for example, 4G network, and the mobile phone can start to transmit multimedia. If an error occurs, it is detected by the PC 139. Based on the detection, the PC 139 is configured to extract the specific telephone number associated with the EDU 140, and cause the dialer 135 to dial the telephone number associated with the 9-1-1 dispatcher using a cellular network within a predefined period of time before the first communication link fails.

It should be clear that an emergency dispatcher center may include a multitude of dispatchers, each having a unique telephone number or extension. If a dispatcher is manning, for example, work-station number 28 and begins to communicate with a UD 130 using the first communication link, e.g., over VOIP, the second communication link will be established between the UD 130-5 and the work-station number 28 when an imminent crash is detected. Although the emergency app 131 installed within the UD 130 may crash, the communication link between the UD 130 and the dispatcher located at work-station number 28 will continue using, for example, a cellular network.

As a non-limiting example, establishing the second communication link may be achieved by providing a phone number of the UD 130 that is identified by the PC 139 while establishing the first communication link to a private branch exchange (PBX) of the EDU 140. According to the same example, the PBX that routes the initial emergency call stores the information associated with the call, i.e., the phone number of the UD 130 and the specific dispatcher's work station to which the initial call was routed. According to the same example, in case the initial emergency call is disconnected, the PBX may connect a second call dialed by the same UD 130 to the same dispatcher for ensuring the continuous communication between the UD 130 and the EDU 140. For example, the PBX associated with the EDU may identify the first communication link from the UD with the parameters associated thereto. When an imminent disconnection of the first communication link is detected, and the UD is used for dialing to the dispatcher unit once again, the PBX routes a call from that UD to the same particular dispatcher.

According to another embodiment, when the PC 139 identifies an imminent crash of the emergency app 131 operative on the UD 130, the PC 139 may send a notification based on the identified error to the OS 137. The OS 137 then sends a signal to the emergency app 131, e.g., via a UNIX® signal handler. The PC 139 extracts from the MU 133 a plurality of characteristics specific to the EDU, e.g. a direct telephone number of the EDU 140. Then the PC 139 may be configured to cause the dialer 135 to dial via a second communication link to a specific telephone number associated with the same dispatcher of the EDU 140. In this embodiment, the PC 139 is configured to extract data from the first EDU connection in order to establish a second communication link if deemed necessary.

Figure 2:
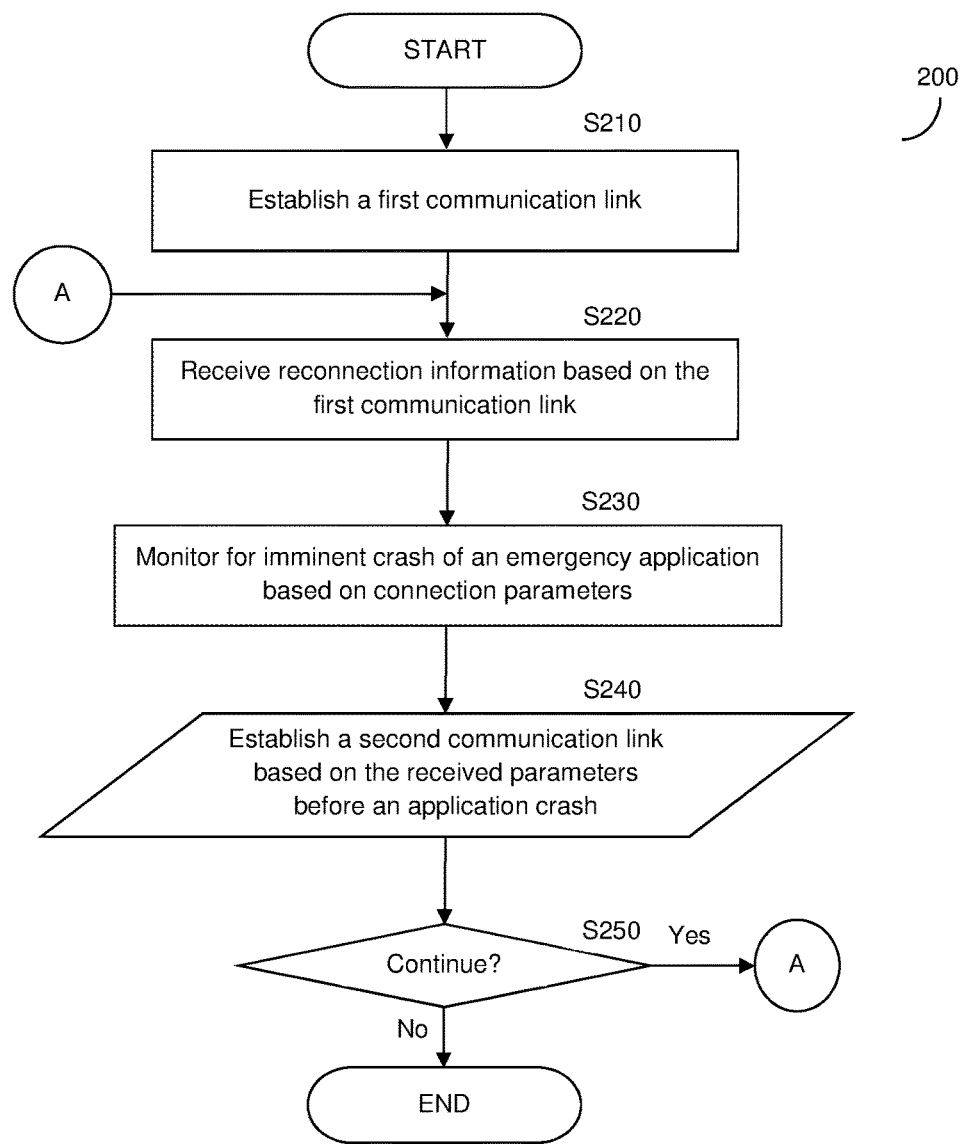
FIG. 2 is a flowchart illustrating a method of ensuring continuous communication between a user device and an emergency dispatcher unit according to an embodiment.

FIG. 2 depicts an exemplary and non-limiting flowchart 200 of the system 100 for ensuring continuous communication between a user device and an emergency dispatcher unit according to an embodiment. At S210, a first communication link is established between a user device (UD) and an emergency dispatcher unit (EDU). The first communication link may be through a wireless network, such as a 4G network, or through a wired network, such as a standard telephonic landline. In an embodiment, the first communication link is established through an emergency application (app) running on a user device.

At S220, reconnection information associated with the first communication link is collected from at least one source, such as a memory unit embedded within the UD. The reconnection information includes at least one means of connecting with the EDU, such as a direct telephone number or a VOIP username. The collection may be executed via a processing circuitry or comparable server connected to the UD.

At 230, the system is monitored for an imminent crash of the app running on the UD, for example by a processing unit of the UD. The detection may include monitoring of the UD to identify an error in a processor command, error in hardware, missing files, corrupt code and the like, each of which may be associated with the interruption of the first communication link between the UD and the EDU.

In an embodiment, the monitoring may include analysis of data previously collected, i.e., data stored in a separate storage, such as a server, from the same UD or other UDs, where the data can be used to establish a connection between specific detected connection parameters and the likelihood of an application crash. The analysis may include applying statistical analysis to the collected data.

At S240, a second communication link between the UD and the EDU is established, e.g., using a second application such as a dialer, to connect to a direct telephone line associated with the EDU 140. The second communication link is established before the first communication link is lost, enabling continuous transmission without any break. At S250, it is checked whether to continue the operation and if so, execution continues with S220; otherwise, the execution terminates.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPCs"), a memory, and input/output interfaces. The computer platform may also include an operating system and microinstruction code. The various processes and functions described herein may be either part of the microinstruction code or part of the application program, or any combination thereof, which may be executed by a CPC, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for ensuring continuous communication between a user device and an emergency dispatcher unit, comprising:
    establishing a first communication link between a user device and an emergency dispatcher unit via a first application installed on the user device;
    receiving reconnection information based on the first communication link;
    performing an analysis of connection parameters related to the first communication link, the connection parameters includes members of a group consisting: files accessed on the user device during the first connection link, a network status, a network load, operating system errors, and an application responsiveness;
    detecting an imminent crash of the first application based on the analysis of connection parameters; and
    establishing, using the reconnection information, a second communication link between the user device and the emergency dispatcher through a second application when an imminent crash is detected, wherein the second communication link is established before the first application crashes, such that there is continuous transmission of communication between the user device and the emergency dispatcher unit.

2. The method of claim 1, wherein the reconnection information comprises at least one of: a direct telephone number of the emergency dispatcher unit, a voice over internet protocol identification of the emergency dispatcher unit.

3. The method of claim 1, wherein the second application is a dialer, and wherein establishing the second communication link further comprises:
    causing the dialer of the user device to connect to the emergency dispatcher unit using the reconnection information.

4. The method of claim 1, wherein the first communication link and the second communication link are established over at least one of: a wireless network, a cellular network, and a wired network.

5. The method of claim 1, wherein the first communication link and the second link are established over different networks.

6. The method of claim 1, wherein the analysis is based on a statistical analysis of data collected from one or more other user devices.

7. The method of claim 1, wherein the analysis is based on a statistical analysis of data collected from the user device before the first communication link is established.

8. The method of claim 1, further comprising:
    sending the analyzed connection parameters to a remote server when an imminent crash is detected.

9. The method of claim 8, wherein connection parameters are accessed from the remote server are used in determining if the detected crash is imminent.

10. A non-transitory computer readable medium having stored thereon instructions for causing a processing circuitry to perform a process, the process comprising:
- establishing a first communication link between a user device and an emergency dispatcher unit via a first application installed on the user device;
- receiving reconnection information based on the first communication link;
- performing an analysis of connection parameters related to the first communication link, the connection parameters includes members of a group consisting: files accessed on the user device during the first connection link, a network status, a network load, operating system errors, and an application responsiveness;
- detecting an imminent crash of the first application based on the analysis of connection parameters; and
- establishing, using the reconnection information, a second communication link between the user device and the emergency dispatcher through a second application when an imminent crash is detected, wherein the second communication link is established before the first application crashes, such that there is continuous transmission of communication between the user device and the emergency dispatcher unit.

11. A user device for ensuring continuous communication between a user device and an emergency dispatcher unit, the system comprising:
- a processing circuitry; and
- a memory, the memory containing instructions that, when executed by the processing circuitry, configure the user device to:
- establish a first communication link between the user device and an emergency dispatcher unit via a first application installed on the user device;
- receive reconnection information based on the first communication link;
- perform an analysis of connection parameters related to the first communication link, the connection parameters includes members of a group consisting: files accessed on the user device during the first connection link, a network status, a network load, operating system errors, and an application responsiveness;
- detect an imminent crash of the first application based on the analysis of connection parameters; and
- establish, using the reconnection information, a second communication link between the user device and the emergency dispatcher through a second application when an imminent crash is detected, wherein the second communication link is established before the first application crashes, such that there is continuous transmission of communication between the user device and the emergency dispatcher unit.

12. The user device of claim 11, wherein the reconnection information comprises at least one of: a direct telephone number of the emergency dispatcher unit, a voice over internet protocol identification of the emergency dispatcher unit.

13. The user device of claim 11, wherein the second application is a dialer, and wherein establishing the second communication link further comprises:
- causing the dialer of the user device to connect to the emergency dispatcher unit using the reconnection information.

14. The user device of claim 11, wherein the first communication link and the second communication link are established over at least one of: a wireless network, a cellular network, and a wired network.

15. The user device of claim 11, wherein the first communication link and the second link are established over different networks.

16. The user device of claim 11, wherein the user device is further configured to:
- send the analyzed connection parameters to a remote server when an imminent crash is detected.

17. The user device of claim 16, wherein connection parameters are accessed from the remote server are used in determining if the detected crash is imminent.

* * * * *